Sept. 4, 1951 W. H. HANNES 2,566,412
MACHINE FOR FORMING LAWN MOWER BLADES
Filed May 13, 1947 2 Sheets-Sheet 1
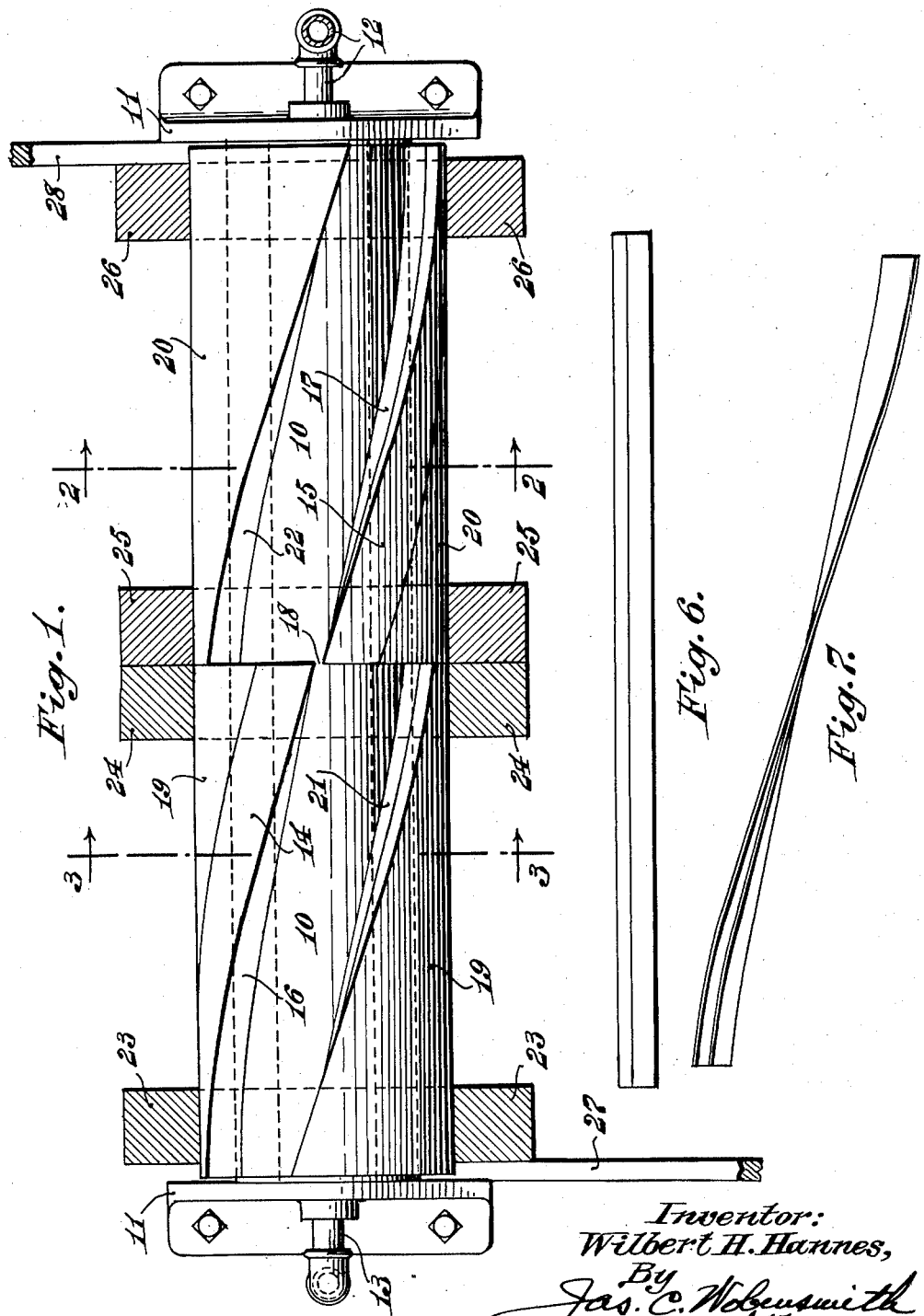
Inventor:
Wilbert H. Hannes,
By Jas. C. Wobensmith
Attorney.

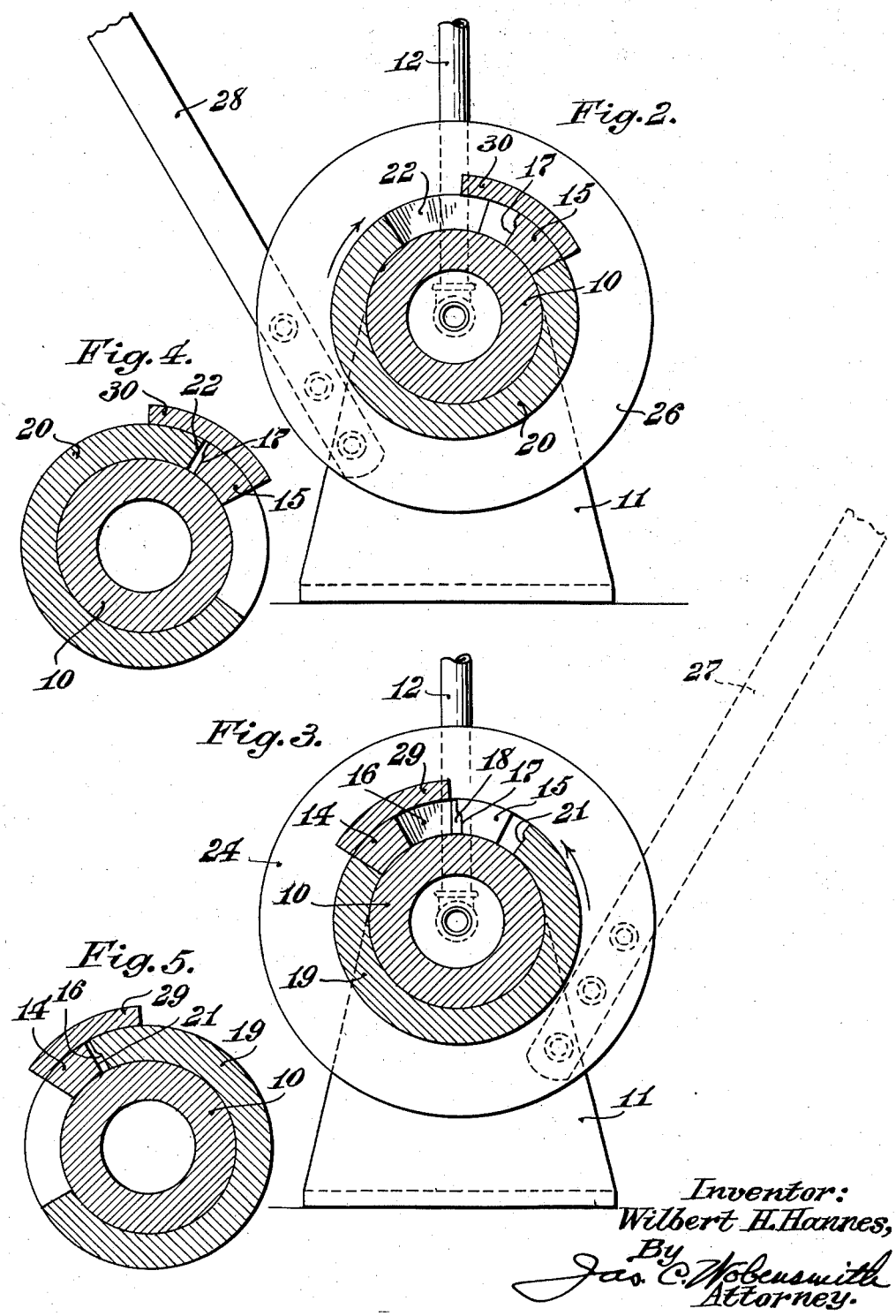

Patented Sept. 4, 1951

2,566,412

UNITED STATES PATENT OFFICE 2,566,412

MACHINE FOR FORMING LAWN MOWER BLADES

Wilbert H. Hannes, Willow Grove, Pa., assignor to Roxy Lawnshear Corporation, Elkins Park, Pa., a corporation of Pennsylvania Application May 13, 1947, Serial No. 747,868

3 Claims. (Cl. 153—78)

This invention relates to machines for forming lawn mower blades, and it relates more particularly to a machine by means of which the rolled steel strips, from which lawn mower blades are made, may be readily and conveniently brought to the proper shape to be mounted in the rotatable cutter assembly of a lawn mower of the ordinary type.

Lawn mower blades of the ordinary type are usually made from rolled strips of steel which are initially straight and of the desired cross-section, the same ordinarily being thicker at the base portion than at the cutting edge portion.

Heretofore it has been quite difficult to bend and shape the straight strips from which lawn mower blades are formed to the proper curvature, as it is well known that for the proper functioning of the cutter blades of a lawn mower, it is necessary that the blades be of the proper form, that is to say, the side faces of the blades must be disposed substantially radially with respect to the axis of the assembly, and the cutting edges must be of helical form and disposed in a surface of a cylinder of revolution, so that the same will function properly with the stationary member against which the edges of the cutter blades bear in the operation of the lawn mower.

The principal object of the present invention is to provide a machine by means of which a straight strip of the desired cross-section may be bent to the form required for mounting the same in the cutter blade assembly of a lawn mower of the ordinary type.

A further object of the invention is to provide a machine, of the character aforesaid, which may be hand or power operated as desired, and by means of which the blades for the cutter assembly of an ordinary lawn mower may be quickly and economically formed.

A further object of the invention is to provide a machine, of the character aforesaid, by means of which the blades will be uniformly shaped to the same pitch, curvature and twist.

The nature and characteristic features of the present invention will be more readily understood from the following description, taken in connection with the accompanying drawing, forming part hereof, in which Figure 1 is a top or plan view, certain parts being shown in section, and certain parts being omitted, of a machine embodying the main features of the present invention;

Fig. 2 is a transverse section of the machine taken on the line 2—2 of Fig. 1;

Fig. 3 is a similar view taken on the line 3—3 of Fig. 1;

Fig. 4 is a view of a portion of the device shown in Fig. 2, but with the operating parts in the closed or operative positions;

Fig. 5 is a view of a portion of the device shown in Fig. 3, but with the operating parts in the closed or operative positions;

Fig. 6 is an elevational view of one of the strips from which the lawn mower blades are made, the same being shown in the straight form before it is operated on in the machine; and Fig. 7 is a plan view of one of the blades after the same has been formed and shaped in the machine of the present invention.

Referring to the drawings, in the particular embodiment of the invention therein shown, 10 is a hollow stationary cylinder of suitable length which is supported at each end by brackets 11 which also serve to close the ends of the cylinder 10. The hollow interior of the cylinder is supplied with a coolant, such as water, by means of a pipe 12, connected at one end through one of the brackets 11, and the coolant, after passing through the hollow interior of the cylinder 10, is carried off by means of a drain pipe 13 connected to the other end of the cylinder through the bracket 11 at that end.

The cylinder 10 is provided, on its outer surface, with a pair of sector members 14 and 15 which are fixedly mounted on the cylinder 10 in any preferred manner. The working faces 16 and 17 of sectors 14 and 15 respectively are complemental to the faces of the blade to be formed in the machine.

It should, however, be noted that the sector member 14 extends from midway the ends of the cylinder to one end thereof with its working face 16 of the proper helical shape, whereas the other sector member 15 extends from midway the ends of the cylinder to the other end thereof with its working face 17 of the proper helical shape.

Where the working faces 16 and 17 of the sector members 14 and 15 terminate adjacent each other midway the two ends of the cylinder they will be spaced sufficiently, as indicated at 18 in Fig. 3 of the drawings, to permit the strip from which the blade is to be formed to pass therethrough.

Rotatably mounted on the respective end portions of the cylinder are sector members 19 and 20 respectively, the working faces 21 and 22 respectively of which are also complemental to the faces of the strip which are to be engaged thereby, and of the proper helical form required to bring the blades to the proper shape.

Ring members 23 and 24 are mounted on the respective end portions on the rotatable sector member 19 and similarly ring members 25 and 26 are mounted on and secured to the ends of the sector member 20.

Any suitable means for rotating the sector members 19 and 20 may be employed, such, for example, as the hand lever 27 which is secured to ring 23 at the end of the rotatable sector member 19 and a corresponding hand lever 28 which is secured to the ring member 26 mounted at the outer end of the rotatable sector member 20.

There are also provided over-hanging sector members 29 and 30 which are preferably secured to the stationary sector members 14 and 15, as indicated in Figs. 2 to 5 of the drawings, the same being omitted from Fig. 1 for the purpose of clarifying the illustration of the principal or more essential parts.

The over-hanging sector members 29 and 30 serve to confine the outer edge of the cutter blade as the same is brought to its proper helical form so that, when the forming is completed, the cutting edge will lie in the surface of a straight cylinder corresponding to the cylinder of revolution formed by the cutting edges of the blades of the cutter blade assembly of the lawn mower.

The operation of the device should now be readily understood. The blade members for the cutter blade assembly are first cut of the proper length from a strip of the desired cross-section, as shown in Fig. 6 of the drawings. A blade strip, of the proper length as aforesaid, is inserted usually from one end of the machine into the spaces between the rotatable sector members 19 and 20 and the stationary sector members 14 and 15 which are secured to the cylinder. The blade is pushed through the space 18 where the innermost ends of the sector members 14 and 15 are contiguous to each other, and the blade is brought to a position in the machine which is approximately symmetrical relative to the medial space 18.

The rotatable members 19 and 20 are now actuated, preferably in unison, to rotate the same about the axis of the cylinder upon which they are mounted, whereupon the blade will be engaged first at the end portions and, when the rotatable sector members 19 and 20 are brought to the final positions, the blade will be bent and formed to the true helical form substantially shown in Fig. 7 of the drawings.

During the forming operation, the over-hanging sector members 29 and 30 will serve to confine the blade and insure that the cutting edge will lie in the surface of a cylinder which conforms to the cylinder of revolution of the cutter blade assembly of the completed lawn mower.

By the peculiar arrangement of the rotatable sector members, as hereinbefore described, it is possible in a machine of this character to form, in one operation, a helical blade of the pitch and length required in the modern lawn mowers. In many instances, this would not be possible, if a single stationary sector member and a single rotatable sector member were employed, as the initially straight bar, from which the lawn mower blade is made, could not be positioned on the base cylinder between such a single pair of coacting sector members.

I claim:

1. A machine for forming blades for the rotatable cutter blade assembly of a lawn mower comprising a cylinder, stationary sector members fixedly mounted on said cylinder, one on each end portion thereof, sector members rotatably mounted on the cylinder, one on each end portion thereof and adapted to coact with the stationary sector members, one of said stationary sector members having a helical working face complemental to one face portion of one end of the blade to form a seat against which said end of the blade is formed, the other of said stationary sector members having a helical working face complemental to the other face portion of the other end of the blade to form a seat against which said other end of the blade is formed, said rotatable sector members each having its axis of rotation coincident with the axis of the cylinder, and means for respectively actuating the rotatable sector members in opposite directions from the open positions to the forming positions thereby to shape the blade to the helical form defined by the face portions of the sector members.

2. A machine for forming blades for the rotatable cutter blade assembly of a lawn mower comprising a cylinder, stationary sector members fixedly mounted on said cylinder, one on each end portion thereof, sector members rotatably mounted on the cylinder, one on each portion thereof and adapted to coact with the stationary sector members, one of said stationary sector members having a helical working face complemental to one face portion of one end of the blade to form a seat against which said end of the blade is formed, the other of said stationary sector members having a helical working face complemental to the other face portion of the other end of the blade to form a seat against which said other end of the blade is formed, said rotatable sector members each having its axis of rotation coincident with the axis of the cylinder, over-hanging sector members adapted to confine the blade within the forming spaces between the stationary sector members and the rotatable sector members, and means for respectively actuating the rotatable sector members in opposite directions from the open positions to the forming positions thereby to shape the blade to the helical form defined by the face portions of the sector members.

3. A machine for forming blades for the rotatable cutter blade assembly of a lawn mower comprising a hollow cylinder, means for circulating a coolant through said cylinder, stationary sector members fixedly mounted on said cylinder, one on each end portion thereof, sector members rotatably mounted on the cylinder, one on each end portion thereof and adapted to coact with the stationary sector members, one of said stationary sector members having a helical working face complemental to one face portion of one end of the blade to form a seat against which said end of the blade is formed, the other of said stationary sector members having a helical working face complemental to the other face portion of the other end of the blade to form a seat against which said other end of the blade is formed, said rotatable sector members each having its axis of rotation coincident with the axis of the cylinder, over-hanging sector members adapted to confine the blade within the forming spaces between the stationary sector members and the rotatable sector members, and means for respectively actuating the rotatable sector members in opposite directions from the open positions to the forming positions thereby to shape the blade to the helical form defined by the face portions of the sector members.

WILBERT H. HANNES.

REFERENCES CITED

The following references are of record in the file of this patent:

UNITED STATES PATENTS

| Number | Name | Date |
|---|---|---|
| 340,024 | Williams | Apr. 13, 1866 |
| 1,004,801 | Marsh | Oct. 3, 1911 |

FOREIGN PATENTS

| Number | Country | Date |
|---|---|---|
| 283,875 | Great Britain | Oct. 4, 1928 |